United States Patent [19]

Tophinke

[11] Patent Number: 4,653,515

[45] Date of Patent: Mar. 31, 1987

[54] SELF-PROPELLED HARVESTER THRESHER

[75] Inventor: Franz Tophinke, Harsewinkel, Fed. Rep. of Germany

[73] Assignee: Claas Ohg, Harsewinkel, Fed. Rep. of Germany

[21] Appl. No.: 758,544

[22] Filed: Jul. 24, 1985

[30] Foreign Application Priority Data

Aug. 10, 1984 [DE] Fed. Rep. of Germany ....... 3429468

[51] Int. Cl.⁴ .............................................. A01F 12/00
[52] U.S. Cl. ................................... 130/27 T; 130/27 R
[58] Field of Search ................... 130/27 R, 27 T, 27 P

[56] References Cited

U.S. PATENT DOCUMENTS

| 3,946,746 | 3/1976 | Decoiene et al. | 130/27 P |
| 4,303,078 | 12/1981 | Stokland | 130/27 P |
| 4,305,407 | 12/1981 | De Coene et al. | 130/27 P |
| 4,312,366 | 1/1982 | DeBusscher et al. | 130/27 T |
| 4,328,015 | 5/1982 | Rowland-Hill | 130/27 T |
| 4,478,226 | 10/1984 | Tophinke et al. | 130/27 T |

FOREIGN PATENT DOCUMENTS 2462568 10/1977 Fed. Rep. of Germany .
2746704 9/1981 Fed. Rep. of Germany .

Primary Examiner—Paul J. Hirsch
Attorney, Agent, or Firm—Michael J. Striker

[57] ABSTRACT

A self-propelled harvester thresher has a threshing mechanism operating in accordance with a radial flow, a separating mechanism operating in accordance with an axial flow, and a transfer drum located between the threshing mechanism and the separating mechanism and subdividing the threshed product stream so that it is supplied in two partial streams at both sides of the axis of rotation of the separating rotor and a supporting member of the latter.

9 Claims, 4 Drawing Figures

SELF-PROPELLED HARVESTER THRESHER

BACKGROUND OF THE INVENTION

The present invention relates to a self-propelled harvester thresher. More particularly, it relates to a self-propelled harvester thresher which has a cutting trough, an inclined conveyor transporting the cut product from the cutting trough to a threshing mechanism which includes a threshing drum and a threshing basket and operates in accordance with a radial flow, and a separating mechanism, including a separating rotor and a separating housing and operating in accordance with an axial flow to separate the threshed product, wherein the threshing mechanism is wider than the separating mechanism.

Harvester threshers of the above-mentioned general type are known in the art. The separating rotors of the known harvester threshers are supported at their front ends, as considered in the traveling direction, by means of powerful supporting members on the upper wall of the machine housing. In this construction the supplied straw stream often makes jams in front of the supporting member and thereby destroys the unobjectionable product supply to the separating unit. It has been recognized in practice that such jam grows so that the product supply is completely interrupted and the harvester thresher must be stopped for manual removal of the straw mass jammed before the separating unit.

SUMMARY OF THE INVENTION

Accordingly, it is an object of the present invention to provide a self-propelled harvester thresher which avoids the disadvantages of the prior art.

More particularly, it is an object of the present invention to provide a self-propelled harvester thresher of the above-mentioned general type, which is formed so that it provides an unobjectionable product supply to its separating unit in a satisfactory manner.

In keeping with these objects and with others which will become apparent hereinafter, one feature of the present invention resides, briefly stated, in a self-propelled harvester thresher in which between the radial flow-operating threshing mechanism and an axial flow-operating separating mechanism, subdividing means is provided for subdividing the threshed straw stream in at least two partial streams which are supplied to the separating mechanism at two radial sides of the axis of rotation of its separating rotor.

When the harvester thresher is designed in accordance with the pressent invention, no jams of the product are formed in front of the supporting member of the separating rotor and unobjectionable product supply toward and in the separating mechanism is attained.

In accordance with another advantageous feature of the present invention, the subdividing means is formed by a transfer drum which is located between the threshing unit and the separating unit and rotates about an axis which is parallel to the axis of rotation of the threshing drum. The transverse drum subdivides the product stream into two partial streams.

In accordance with still another structurally advantageous feature of the present invention, the transfer drum is provided with guiding blades in its end region for guiding the straw stream from outside inwardly and it is also provided in its central region with guiding blades which subdivide the product in the center region of the transfer drum and in the region of the axis of rotation of the separating rotor, and guide the product outwardly.

When the harvester thresher has more than one separating rotor and separating housing and the separating housings are arranged at a distance from one another, a further advantageous feature of the present invention is that the subdividing means has a single transfer drum associated with all separating rotors and provided with several groups of guiding blades arranged so that each group of the guiding blades is associated with a respective one of the separating rollers and subdivides the straw stream supply to each separating rotor into two partial streams.

For loosening the straw stream, it is advantageous in accordance with still a further feature of the present invention to provide at least some of the guiding blades at their sides opposite to the transfer drum, with cutouts.

Guiding plates can be arranged between the transfer drum and the separating rotor, so as to substantially facilitate the transfer of the subdivided partial streams from the transfer drum to the separating rotor.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
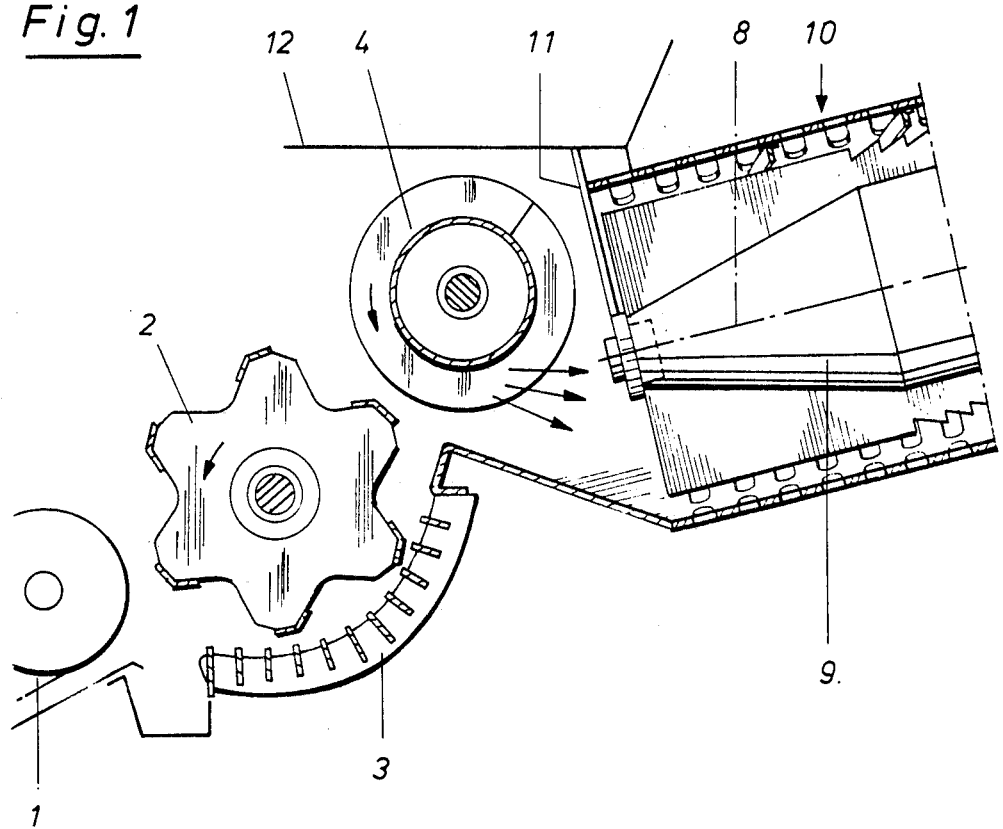
FIG. 1 is a side view showing a part of the harvester thresher in accordance with the present invention.

A self-propelled harvester thresher in accordance with the present invention has an inclined conveyor identified with reference numeral 1 and supplying the harvested product. A thresher is arranged after the inclined conveyor 1 and has a threshing drum 2 which cooperates in a known manner with a threshing basket 3. The threshing drum 2 extends transversely to the traveling direction of the harvester thresher and threshes the product in a radial flow. The stream of straw which still includes residual grains is supplied by the thresher to a transfer drum 4.

Figure 3:
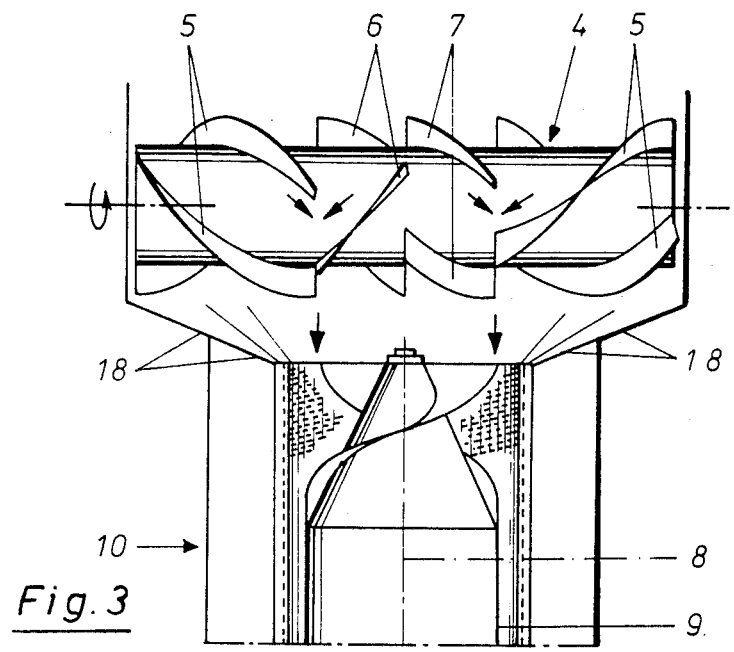
FIG. 3 is a plan view showing the transfer drum and the front part of a separating mechanism of the inventive harvester thresher.

As can be seen from FIG. 3, the transfer drum 4 has end blades 5 which are arranged in its both end regions and transport the straw stream from outside inwardly. The transfer drum 4 is also provided with two groups of guide blades 6 and 7 which are arranged in its central region. The guide blades 6 and 7 centrally subdivide the straw stream and guide it outwardly. This is important for the reason which will explained hereinbelow.

A separating unit 10 is located after the transfer drum 4. It has a separating rotor 9 which rotates about an axis of rotation 8. A support member 11 supports the rotor 10 at its inlet side. The support member 11 is mounted at its end opposite to the axis of rotation 8 on a schematically shown machine housing 12.

Since the transfer drum 4 is provided with two groups of the guiding blades 6 and 7 which separate centrally the straw stream and guide the same outwardly, the thus separated straw stream flows into the separating unit 10 at both sides of the axis of rotation 8 of the separating drum 9 and therefore cannot cause jams either at the front side before the separating rotor 10 9, or before the support member 11 which holds the rotor 9.

Figure 2:
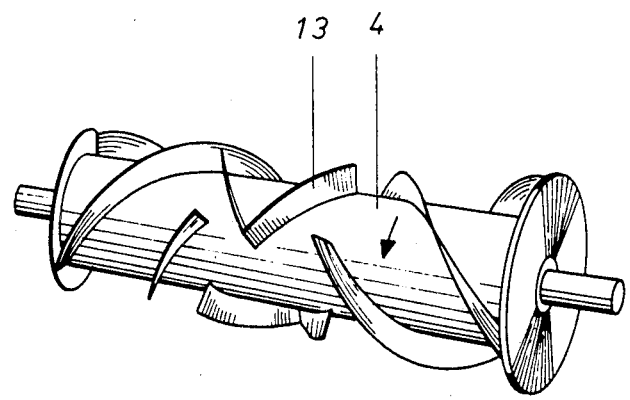
FIG. 2 is a perspective view showing a transfer drum of the inventive harvester thresher.
Figure 4:
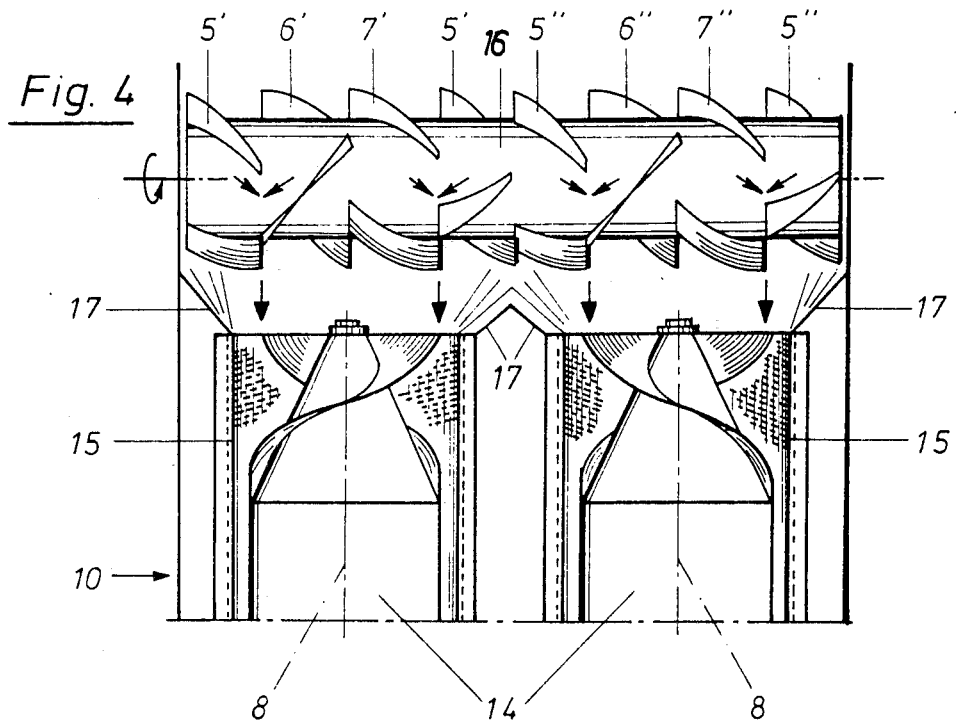
FIG. 4 is a plan view showing a transfer drum and a separating mechanism including two separating rotors, in accordance with another embodiment of the present invention.

In the embodiment shown in FIG. 3, the guiding blades 6 and 7 which centrally subdivide the straw stream are formed as separate blades. In contrast, in the embodiment shown in FIG. 2, the transfer drum 4 has central blades 13 which are wedge-shaped. If the separating unit is composed of more than one separating rotor and more than one separating housing, the transfer drum naturally must be formed in correspondence with such a separating unit. An example of this is shown in FIG. 4. Here, the separating unit has two separating rotors 14 and two separating housing 15. Only one transfer drum 16 is arranged before the separating unit. Actually, the transfer drum 16 is just a double of the transfer drum 4 shown in FIG. 3. The transfer drum 16 has two groups of blades 5', 6', 7' and 5", 6", 7", formed so that each group corresponds to the blade 5, 6, 7 of the transfer drum 4 shown in FIG. 3. It can be said that each half of the transfer drum 16 has two end blades 5' or 5", and central guiding plates 6', 7' or 6", 7".

For facilitating the guidance of product, the separating units are provided with guiding plates 17 and 18. The guiding plates 17 and 18 are fixed and have a known construction.

It will be understood that each of the elements described above, or two or more together, may also find a useful application in other types of constructions differing from the types described above.

While the invention has been illustrated and described as embodied in a self-propelled harvester thresher, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A self-propelled harvester thresher, comprising cutting means for cutting a harvested product; transporting means arranged after said cutting means for transporting the cut product; threshing means arranged after the transporting means for threshing the transported product and operating in accordance with a radial flow; separating means arranged after said threshing means and operating in accordance with an axial flow, said separating means having two end sides and a separating rotor rotatable about an axis of rotation; and means for subdividing the product threshed by said threshing means into at least two partial streams which are supplied to said separating means at its one end side and at both radial sides of said axis of rotation of said separating rotor.

2. A self-propelled harvester thresher as defined in claim 1, wherein said cutting means includes a cutting trough, said transporting means including an inclined conveyor, said threshing means including a threshing basket and a threshing drum associated with said threshing basket, said separating means also having a separating housing associated with said separating rotor.

3. A self-propelled harvester thresher as defined in claim 1, wherein said threshing means has a threshing drum rotatable about an axis of rotation, said subdividing means including a transfer drum located between said threshing means and said separating means and rotatable about an axis which is parallel to said axis of rotation of said threshing drum so as to subdivide the threshed product into said at least two partial streams.

4. A self-propelled harvester thresher as defined in claim 3, wherein said transfer drum has two end regions and a central region and is provided in said end regions with end guiding blades which guide the threshed product from outside inwardly, and at its central region with central guiding blades which guide the product outwardly and subdivide the threshed product in said central region and in the region of said axis of rotation of said separating rotor.

5. A self-propelled harvester thresher as defined in claim 1, wherein said threshing means has a threshing drum rotatable about an axis of rotation, said separating means including at least two such separating rotors rotatable about axes of rotation which are parallel to said axis of rotation of said threshing drum, said subdividing means including a single transfer drum located between said threshing means and said separating rotors and having at least two groups of guiding blades arranged so that each of said groups of guiding blades is associated with respective one of said separating rotors and subdivides the product stream supplied to each of said separating rotors into at least two partial streams.

6. A self-propelled harvester thresher as defined in claim 4, wherein at least some of said guiding blades have sides which are opposite to said transfer drum and are provided with cutouts.

7. A self-propelled harvester thresher as defined in claim 4, wherein at least some of said guiding blades of said transfer drum have sides which are opposite to said transfer drum and are provided at said sides with shaped portions.

8. A self-propelled harvester thresher as defined in claim 3; and further comprising guiding means provided between said transfer drum and said separating rotor.

9. A self-propelled harvester thresher as defined in claim 8, wherein said guiding means includes a plurality of guiding plates.

* * * * *